United States Patent
Albesiano

(10) Patent No.: US 11,890,924 B2
(45) Date of Patent: Feb. 6, 2024

(54) MOTORCYCLE FORECARRIAGE WITH IMPROVED COOLING AND RELATIVE MOTORCYCLE

(71) Applicant: PIAGGIO & C. S.P.A., Pontedera (IT)

(72) Inventor: Romano Albesiano, Pontedera (IT)

(73) Assignee: PIAGGIO & C. S.P.A, Pontedera (IT)

( * ) Notice: Subject to any disclaimer, the term of this patent is extended or adjusted under 35 U.S.C. 154(b) by 250 days.

(21) Appl. No.: 17/276,857

(22) PCT Filed: Dec. 2, 2019

(86) PCT No.: PCT/IB2019/060360
§ 371 (c)(1),
(2) Date: Mar. 17, 2021

(87) PCT Pub. No.: WO2020/115636
PCT Pub. Date: Jun. 11, 2020

(65) Prior Publication Data
US 2022/0024296 A1 Jan. 27, 2022

(30) Foreign Application Priority Data

Dec. 7, 2018 (IT) .................. 102018000010889

(51) Int. Cl.
*B60K 11/00* (2006.01)
*B60K 11/04* (2006.01)
(Continued)

(52) U.S. Cl.
CPC ............ *B60K 11/04* (2013.01); *B60K 11/08* (2013.01); *B62J 17/10* (2020.02); *B62J 41/00* (2020.02); *B60Y 2200/12* (2013.01)

(58) Field of Classification Search
CPC .......... B60K 11/04; B60K 11/08; B62J 41/00; B62J 17/10
(Continued)

(56) References Cited

U.S. PATENT DOCUMENTS

| 4,633,965 A | * | 1/1987 | Tsurumi | ................ B60K 11/00 165/41 |
| 4,822,067 A | | 4/1989 | Matsuo et al. | |
| 5,211,255 A | * | 5/1993 | Fukuda | .................... B62J 25/00 180/311 |

(Continued)

FOREIGN PATENT DOCUMENTS

| JP | 60110187 U | 7/1985 |
| JP | H01289780 A | 11/1989 |

(Continued)

OTHER PUBLICATIONS

International Search Report for corresponding application PCT/IB2019/060360 filed Dec. 2, 2019; dated May 26, 2020.
(Continued)

*Primary Examiner* — Hau V Phan
(74) *Attorney, Agent, or Firm* — CANTOR COLBURN LLP

(57) ABSTRACT

Motorcycle including a damped support to support a front wheel; a handlebar connected to the damped support to steer the front wheel; at least one radiator configured to cool at least one liquid of an engine of the motorcycle; at least one air conveyor comprising an inlet mouth oriented towards the front of the motorcycle and an outlet mouth facing the radiator; the at least one air conveyor being shaped so as to guide the air entering the inlet mouth towards the outlet mouth; wherein the at least one air conveyor is shaped so as to at least partially envelop the front wheel when the motorcycle is viewed from above.

14 Claims, 6 Drawing Sheets

(51) Int. Cl.
*B62J 41/00* (2020.01)
*B62J 17/10* (2020.01)
*B60K 11/08* (2006.01)

(58) Field of Classification Search
USPC ........................................................ 180/68.4
See application file for complete search history.

(56) References Cited

U.S. PATENT DOCUMENTS

| | | | | |
|---|---|---|---|---|
| 5,330,029 | A * | 7/1994 | Yoshimura | B62J 17/10 |
| | | | | 180/219 |
| 6,544,115 | B1 | 4/2003 | Graf | |
| 7,080,704 | B1 | 7/2006 | Kerner | |
| 7,159,682 | B2 * | 1/2007 | Arnold | B62K 19/30 |
| | | | | 180/68.4 |
| 7,387,180 | B2 * | 6/2008 | Konno | B62J 17/10 |
| | | | | 180/219 |
| 7,448,461 | B2 * | 11/2008 | Misaki | B62J 17/02 |
| | | | | 180/68.1 |
| 7,686,116 | B2 | 3/2010 | Oohashi et al. | |
| 8,566,746 | B2 * | 10/2013 | Chuat | G06F 16/583 |
| | | | | 715/833 |
| 8,757,313 | B2 * | 6/2014 | Iwata | B60K 11/04 |
| | | | | 165/41 |
| 8,881,859 | B2 * | 11/2014 | Nakamura | B62J 17/10 |
| | | | | 180/68.1 |
| 9,004,209 | B2 * | 4/2015 | Kontani | B62J 40/10 |
| | | | | 180/68.3 |
| 2008/0156566 | A1 * | 7/2008 | Oohashi | B60K 11/04 |
| | | | | 180/229 |
| 2016/0016623 | A1 | 1/2016 | Ishii et al. | |
| 2017/0274953 | A1 * | 9/2017 | Niijima | B62J 17/04 |
| 2018/0148122 | A1 * | 5/2018 | Murayama | B62K 11/04 |

FOREIGN PATENT DOCUMENTS

| | | |
|---|---|---|
| JP | H06171568 A | 6/1994 |
| JP | 2007062549 A | 3/2007 |
| JP | 2008179336 A | 8/2008 |

OTHER PUBLICATIONS

Written Opinion for the International Searching Authority for corresponding application PCT/IB2019/060360 filed Dec. 2, 2019; dated May 26, 2020.

* cited by examiner

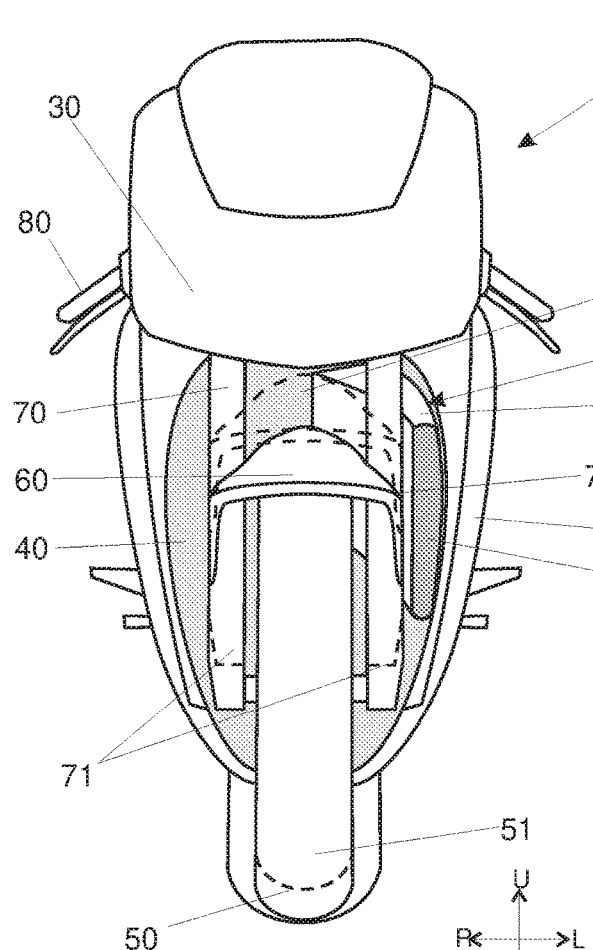
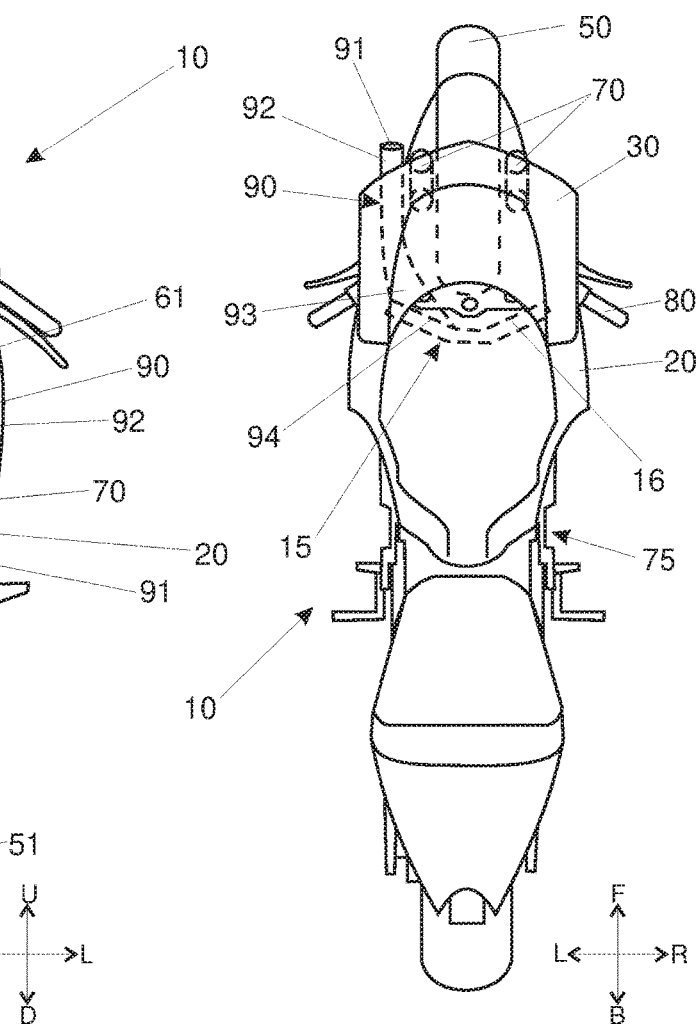
Fig.2A
Fig.2B

MOTORCYCLE FORECARRIAGE WITH IMPROVED COOLING AND RELATIVE MOTORCYCLE

TECHNICAL FIELD

The present disclosure relates to a forecarriage of a motorcycle with improved cooling, intended in particular for racing applications and the relative sports motorcycle comprising said forecarriage.

BACKGROUND

As shown in FIG. 1, the mouth 4 of the air cooling system in motorcycles 1, particularly racing ones, is known to be in the front part of the fairing 2. Specifically, it is located under the cowl 3 of the motorcycle 1 and generally has an almost elliptical shape, as shown in FIG. 1. Said mouth 4, looking at the vehicle from the front, as shown in FIG. 1 is covered by the front wheel 5, the fender 6 thereof and the front wheel support system of the vehicle 1, i.e. the front suspension 7. Consequently, the air flow that encounters the vehicle 1 in its advancement, touches the wheel 5, the fender 6 and the suspension 7 and enters the mouth 4, while another portion of the air flow enters directly into the portion of the mouth 4 not covered by the front wheel 5, the fender 6 thereof and the front suspension 7. During braking, the motorcycle 1 becomes unbalanced forward and the suspension 7 is shortened. The cowl 3, together with the chassis and the fairing 2 move vertically with respect to the front wheel 5, and consequently the portion of the mouth 4 not covered by the fender 6', by the front wheel 5' and by the suspension 7' decreases appreciably. Moreover, during braking, the air flow that encounters the motorcycle 1 is lower due to its lower speed. If the weather is particularly hot, during a race, these two factors can generate a substantial overheating of the engine of the motorcycle 1. On the contrary, during acceleration, the fairing 2, the chassis and the cowl 2 rise from the ground, moving away from the front wheel 5. In this case, the obstacle-free portion of the mouth 4 increases. Since the air flow also increases due to the greater speed, the air volume intended to cool the engine fluid is sometimes even excessive. The extension of the suspension 7 and the consequent increase of the mouth 4 portion exposed directly to the air flow, creates an undesired parachute effect which slows down the motorcycle 1 reducing the speed thereof.

This strong variability of the section of the cooling duct imposes an over-sizing of the liquid radiators (be they water and/or oil), in order to always guarantee an adequate cooling of the engine. The oversizing obviously involves further drawbacks in terms of overall dimensions, weights and costs.

As confirmation of the above, from measurements carried out on vehicles, for example on a lap, it was verified that the temperature of the water and the oil drop strongly on a straight road, just when there is the maximum of the cooling flow, and increase strongly during braking.

It would therefore be useful to have an engine coolant cooling system capable of ensuring substantially uniform performance both during braking and acceleration. It would also be useful to have a system which, in combination with the foregoing, allows not to reduce the performance in terms of the aerodynamic drag coefficient of the motorcycle during the acceleration step.

BRIEF SUMMARY

The need of solving the drawbacks and limitations mentioned with reference to the prior art is therefore felt.

Such a need is met by a motorcycle comprising: a damped support for supporting a front wheel; a handlebar connected to said damped support for steering said front wheel; at least one radiator configured to cool at least one liquid of an engine of the motorcycle, said radiator being covered at least in part by said front wheel in a front view of the motorcycle; at least an air conveyor comprising an inlet mouth oriented toward the front of the motorcycle and an outlet mouth faced toward said radiator; said at least an air conveyor being shaped so to conduct the air entering in the inlet mouth toward the outlet mouth; wherein said at least one air conveyor is shaped so as to at least partially surround said front wheel when the motorcycle is viewed from above, said front wheel and said at least an air conveyor are at least partly overlapped each other in a side view of the motorcycle.

DESCRIPTION OF THE DRAWINGS

Further features and advantages of the present disclosure will appear more clearly from the following description of preferred non-limiting embodiments thereof, in which:

FIG. 2A shows a front view of a motorcycle according to a first embodiment of the present disclosure;

FIG. 2B shows the motorcycle of FIG. 2A seen from above;

DETAILED DESCRIPTION

Figure 1:
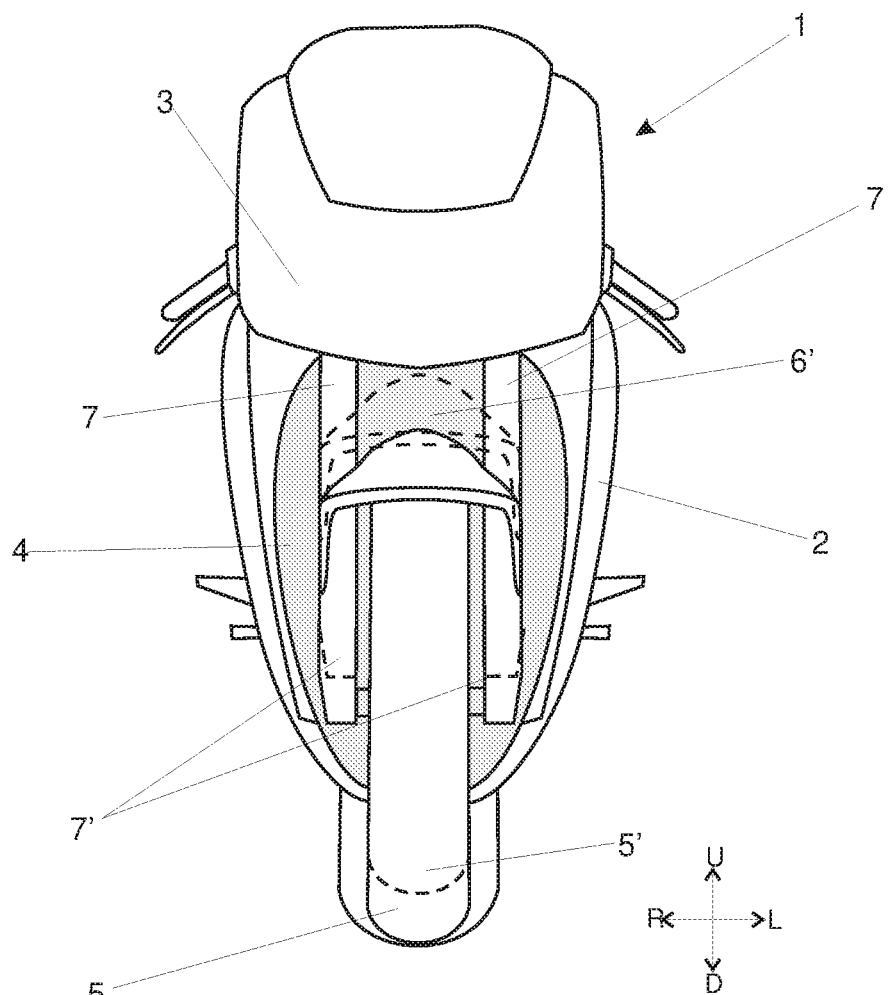
FIG. 1 shows a front view of a motorcycle known in the prior art.

The following description of one or more embodiments of the disclosure relates to the accompanying drawings. The same numerical references in the drawings identify identical or similar elements. The object of the disclosure is defined by the appended claims. The technical details, structures or features of the solutions described below may be combined with each other in any way.

With reference to the above figures, reference numeral 10 denotes a motorcycle according to the present disclosure.

The motorcycle 10 extends from a forecarriage, which supports a front wheel 50 to a rear axle which supports a rear wheel 55.

The front wheel 50 is supported by a damped support 70, typically a fork comprising suspensions, connected to the handlebar 80. For the purposes of the present disclosure, other types of damped support for the front wheel 50 may be provided. Therefore it is possible to provide the conventional fork solution, both traditional and with upside-down stems, but also so-called single-arm solutions with a partially cantilevered front wheel.

The motorcycle 10 comprises an internal combustion engine 75 which is provided with a cooling system. In particular, the cooling system comprises at least one cooling radiator 15 for one or more liquids such as water, i.e. cooling liquid, and lubricating oil of the engine 75.

Said cooling radiator 15 performs a heat exchange between the liquid circulating therein (water or oil) and the outside air suitably conveyed onto a heat exchange surface of the cooling radiator 15, suitably finned in a known manner.

Advantageously, at least one air conveyor 90 is provided on the forecarriage of the motorcycle 10. Said conveyor 90 comprises a first base portion 93 comprising an outlet mouth 94 and a second elongated portion 92 comprising at least one inlet mouth 91. Said portions 92, 93 of the conveyor 91 are continuous with each other and define therein a channel substantially devoid of internal reliefs and shaped so as to convey the air according to a substantially laminar pattern from the at least one inlet mouth 91 to the outlet mouth 94 of the conveyor 90.

Figure 5:
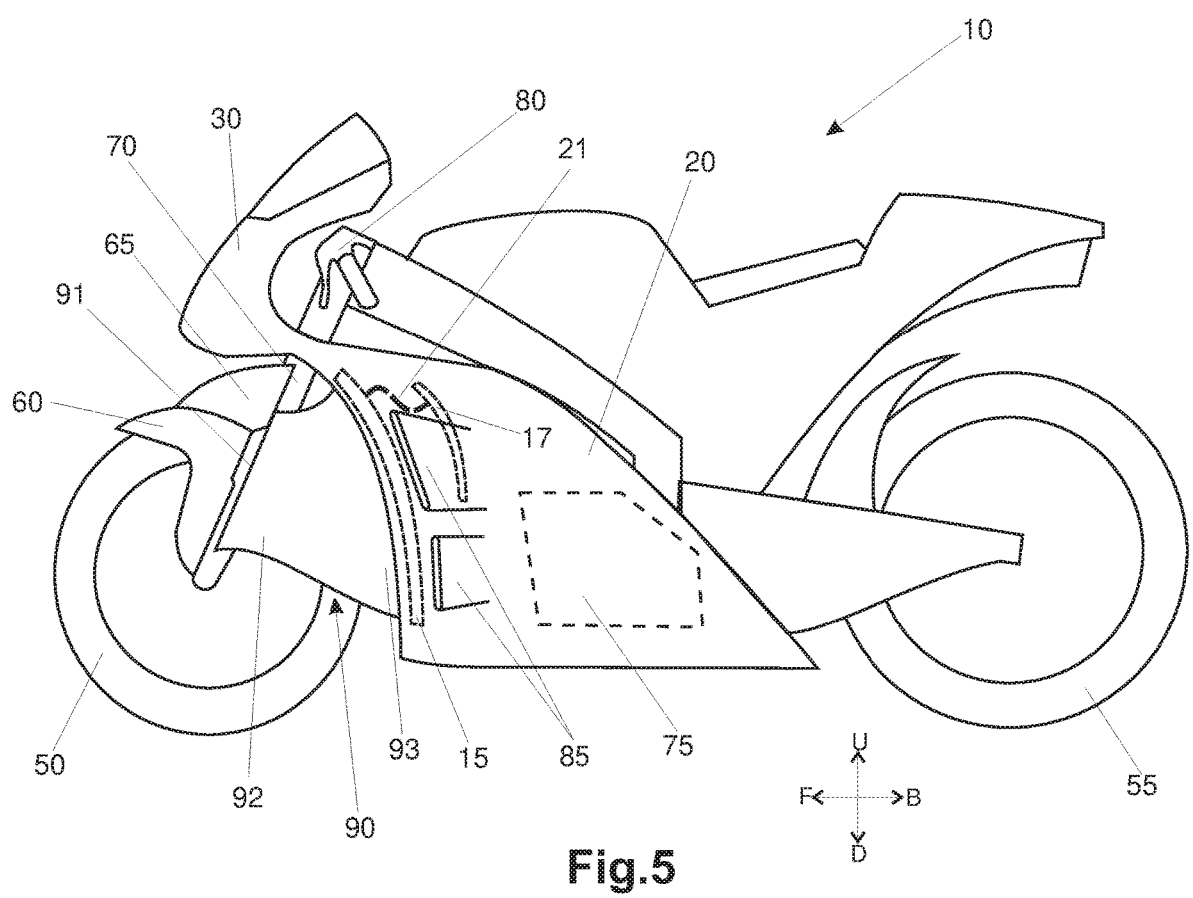
FIG. 5 shows a lateral view of a motorcycle according to the present disclosure.

The elongated portion 92 is arranged so as to be alongside the front wheel 50, in each of its steering movements. The elongated portion 92 is shaped so that the inlet mouth 91 is arranged substantially alongside a damped support 70 of the motorcycle 10, when the vehicle is viewed laterally as shown in FIG. 5. The front wheel 50 partly, or at least partly, covers the radiator 15, observing in the motorcycle 10 frontally, limiting the flow of incoming air. The inlet mouth 91 is therefore in an advanced position with respect to the radiator 15 to capture the air regardless of the movements of the front wheel 50 and the damped support 70.

The inlet mouth 91 of the conveyor 90 is arranged so as to face the motorcycle 10 frontally. In particular, the inlet mouth 91 lies on a plane substantially perpendicular to the centreline plane M of the motorcycle 10. Said plane, in addition to being substantially perpendicular to the centreline plane M, is inclined with respect to the vertical to the ground so that the upper portion of the inlet mouth 91 is retracted with respect to the lower portion thereof. This inclination is such that, when the motorcycle 10 pitches forward due to braking, the inlet mouth is in a position almost perpendicular to the ground, thus improving the air flow rate entering the conveyor 90. Alternatively, the inlet mouth 91 may be inclined with respect to the ground by the same angle of inclination of the damped support 70, as shown in FIG. 5. In this case, as it is better illustrated below, if the fender 60 is shaped so as to deviate the air laterally, the inlet mouth 91 thus inclined allows collecting the air deviated by the fender.

Figure 3A:
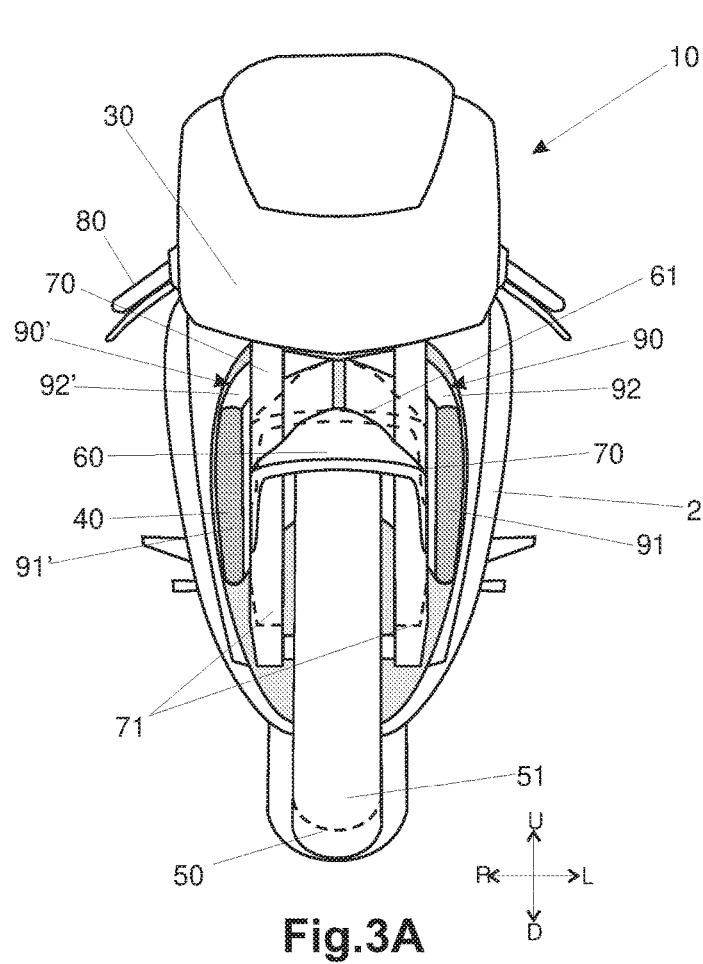
FIG. 3A shows a front view of a motorcycle according to a second embodiment of the present disclosure.
Figure 3B:
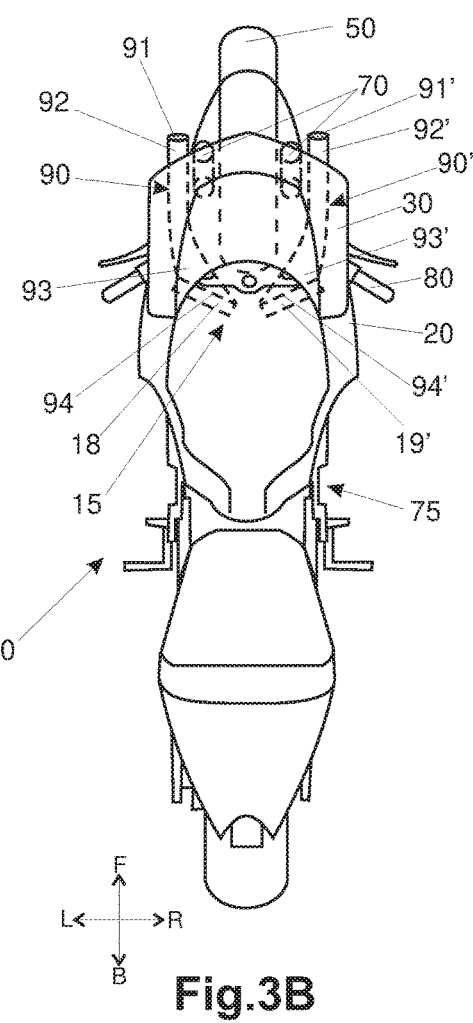
FIG. 3B shows the motorcycle of FIG. 3A seen from above.
Figure 4A:
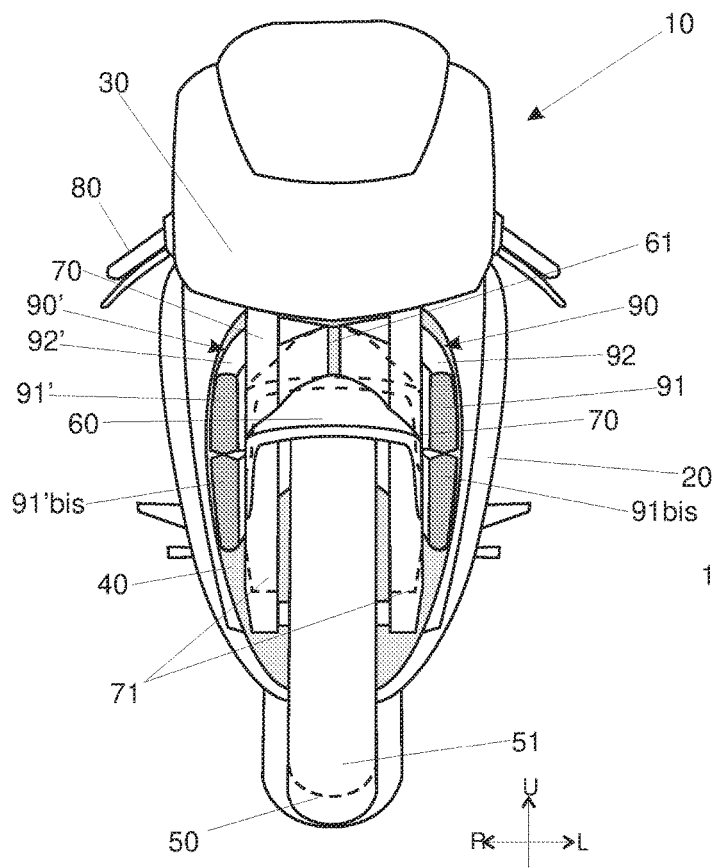
FIG. 4A shows a front view of a motorcycle according to a third embodiment of the present disclosure.
Figure 4B:
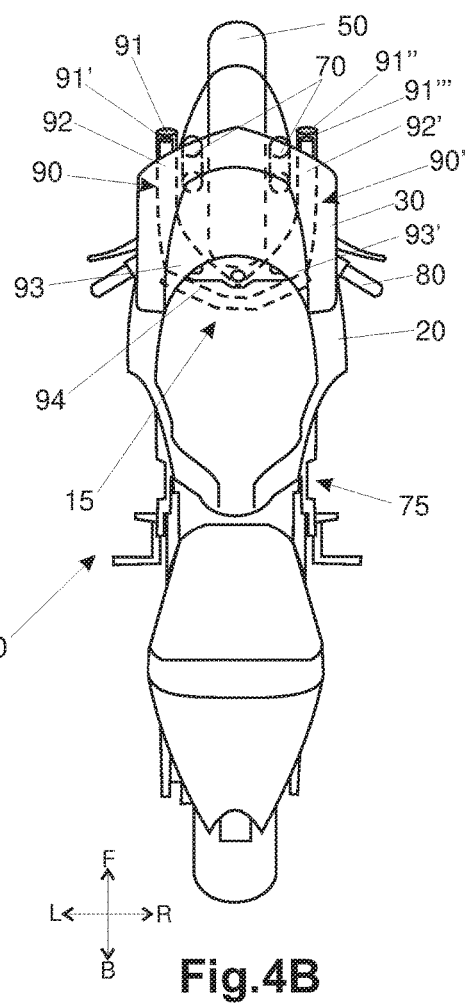
FIG. 4B shows the motorcycle of FIG. 4A seen from above.

The air conveyor 90 is generally shaped, if viewed from above as in FIGS. 2B, 3B and 4B to at least partially envelop the front wheel 50, in particular the rear half thereof. The conveyor 90, if viewed from the side, overlaps at least partially with the wheel 50, as shown in FIG. 5. The conveyor 90 is also shaped so as not to interfere with the steering of the front wheel 50. It should be noted that in motorcycles 10 for speed competitions, such as those competing in MotoGP™, the steering angle of the front wheel 50 is less than in other types of motorcycles such as scooters or enduro bikes.

The radiator 15 in these sport bikes is located behind the front wheel 50 and part of the air flow entering the radiator 15 thanks to the advancement motion of the motorcycle 10 is blocked by the front wheel 50 itself. The axis of rotation of the front wheel 50 is arranged between the upper end and the lower end of the radiator 15 if the motorcycle 10 is viewed laterally. The conveyor 90 embraces and overlaps the front wheel 50 if the motorcycle 10 is viewed from the side, when the motorcycle is unloaded and lies in an upright position. In particular, the inlet mouth 91 of each conveyor 90 lies at least partly within the contour of the front wheel 50, if the motorcycle 10 is viewed laterally. This positioning of the conveyor 90 and of the relative inlet mouth 91 allows partially or totally recovering the air which otherwise the radiator 15 would not receive since it is partially covered by the front wheel 50. Preferably, said inlet mouth 91, 91', 91", 91''' of the at least one air conveyor 90, 90' lies at the side of the front wheel 50 if the motorcycle 10 is viewed frontally.

The base portion 93 is shaped so as to completely or partly cover the radiator 15 so as to convey all the air collected from the conveyor 90 towards the radiator 15. Consequently, the outlet mouth 94 faces the radiator 15 and covers it at least in part. The base portion 93 of the conveyor 90 may be connected directly to the radiator 15 or through a sealing profile 98, so that the fluid connection between the conveyor 90 and the radiator 15 is fluid-tight.

The air that enters the conveyor 90 is therefore entirely conveyed towards the radiator 15, so as to pass therethrough. The motorcycle 10 also has openings 85 on the fairing 20 positioned and shaped so that the air which has passed through the radiator 15 can escape from the vehicle 10 through said openings 85, visible in FIG. 5.

As shown in FIGS. 2A and 2B, the air conveyor 90 may be one and may be provided with a single inlet mouth 91. In this embodiment, illustrated in FIG. 2B, the conveyor 90 can convey the incoming air on a part of the radiator 15, letting the remaining part 16 of the radiator 15 be cooled by the air in the traditional manner, that is without the conveyor. In an alternative (not shown), the conveyor 90 is shaped so as to completely cover the radiator 15.

As shown in FIGS. 3A and 3B, the air conveyors 90, 90' may be two and each provided with its own inlet mouth 91, 91'. In this second embodiment, the radiator 15 comprises two radiator portions 18, 19'. The first conveyor 90 conveys the air collected towards a first radiator portion 18, while the second conveyor 90' conveys the air collected towards a second radiator portion 19'. The first radiator portion 18 may be configured to cool a first liquid, for example the engine oil, while the second radiator portion 19' may be configured to cool a second liquid, for example the cooling water of the engine 75. In an alternative not shown, both conveyors 90, 90' convey the collected air on a single radiator 15 configured to cool a single liquid of the motorcycle 10. In a further alternative not shown, the two conveyors 90, 90' actually are a single piece, i.e. they comprise a common base portion, which faces a cooling radiator and two elongated portions branch out from this common base portion which flank the front wheel 50 on the right and left, respectively. This version allows optimizing the air flows inside the conveyor and therefore the exchange of air with the radiator. To better understand the concept, reference may be made to the conveyor of the following embodiment.

Figure 6:
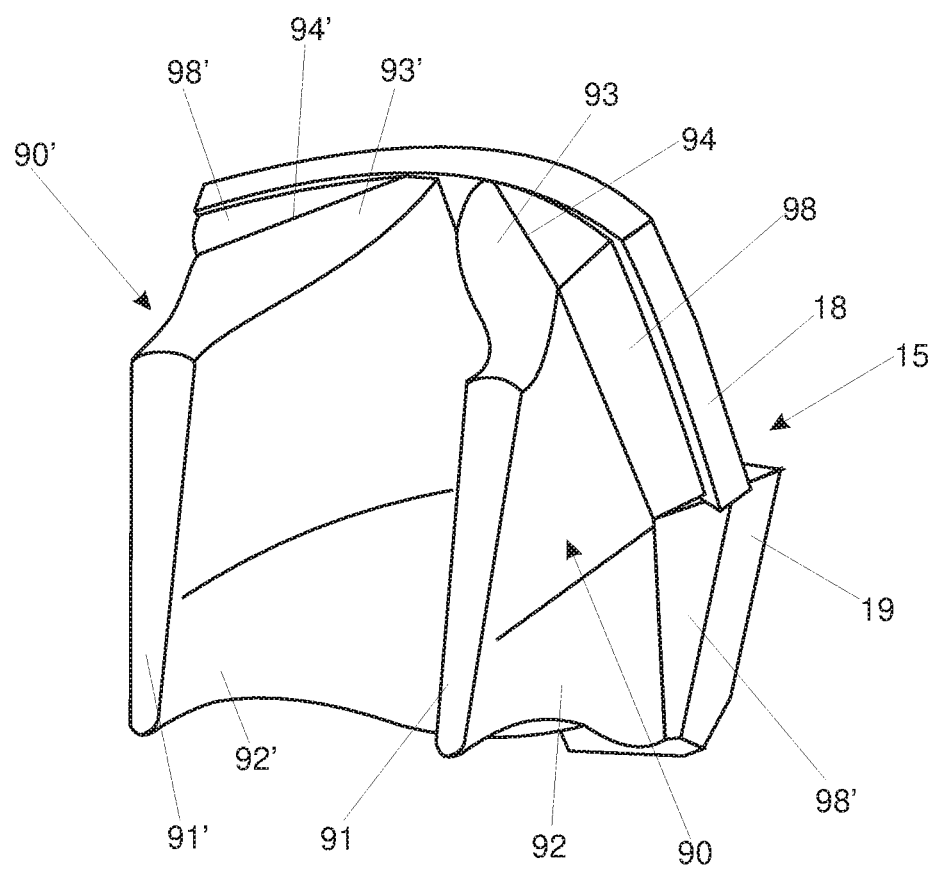
FIG. 6 shows an axonometric view of a cooling system comprising radiator and air conveyor according to the second embodiment of the present disclosure.

As shown in FIGS. 4A and 4B, the air conveyors 90 may be one, but with two elongated portions 92, 92' and two inlet mouths 91, 91', 91", 91''' for each elongated portion 92, 92'. In this third embodiment, the conveyor is a single piece and has a common base portion 93 and two elongated portions 92, 92' which branch off to the right and left of the front wheel 50, respectively. The conveyor 90 may also be made in two pieces joined together at the centre line M of the motorcycle 10, for ease of construction and assembly. The two elongated portions 92, 92' of the conveyor 90 each comprise two inlet mouths. The elongated left portion 92 comprises a first inlet mouth 91 and a second inlet mouth 91', while the right elongated portion 92' comprises a third inlet mouth 91" and a fourth inlet mouth 91'''. The terms right and left refer to the motorcycle 10 seen from above as shown in FIGS. 2B, 3B and 4B. Said inlet mouths may also be three, that is two on an elongated portion and one on the other elongated portion. The conveyor 90 may be divided internally by a substantially longitudinal partition (not shown) which divides it by two portions, one upper and one lower. The upper inlet mouths 91', 91''' serve as an air inlet in the upper portion of the conveyor 90, while the lower inlets 91, 91''' serve as an air inlet in the lower portion of the conveyor 90. Said upper and lower portions are shaped and arranged so as to convey the air on two respective portions of the radiator 15, an upper and a lower one. Each of said upper and lower portions of the radiator 15 is configured to cool its own cooling liquid with air, for example one oil and the other water. In this embodiment, the outlet mouths are therefore two, one upper and one lower. Alternatively, the internal partition may be interrupted before the outlet mouth, so that the outlet mouth 94 is one for both the upper and lower portions of the conveyor 90. In the version shown in FIG. 6, each air conveyor 90, 90' comprises a partition (not visible) which separates it into two air channels (upper and lower). Said partition is arranged in the air conveyor 90, 90' downstream of the inlet mouth 91, 91'. The upper air channels are therefore separated from the lower air channels up to the respective outlet mouths 94, 94'. At the outlet mouths 94, 94' there are two independent radiator portions 18, 19 arranged one above the other. In a further embodiment, said partition is absent and each of the two air conveyors 90, 90' conveys the air to both the upper portion 18 and the lower portion 19 of the radiator 15. The fluid connection between said air conveyors 90, 90' and the radiator portions 18,19 is implemented through respective sealing profiles 98, 98'.

In each of the three embodiments described above, the entry of air into the conveyor 90 is independent of the position of the wheel 50, 51, of the damped support 70, 71 and of the front fender 60, 61, as can be seen in FIGS. 2A, 3A, 4A. Since the passage section of the conveyors 90 does not vary with the variation of the attitude of the motorcycle 10, for example increasing in acceleration and reducing in braking (as happens in the known solutions), it is possible to guarantee a greater constancy in the cooling efficiency of the cooling radiator 15.

It is clear that an alternative number of conveyors 90 can be easily designed according to the number and arrangement of the cooling radiators of the vehicle. For example, the conveyors may all be arranged from the same side of the front wheel 50 or they may be three.

In the case of an air conveyor 90 on the side of the front wheel 50, these may be symmetrical or differ one with respect to the other in terms of position (height and distance with respect to the wheel center) and area of the inlet mouth 91 and/or outlet mouth 94.

Said at least one conveyor 90 is preferably made of polymeric material or composite material, such as carbon fiber.

To optimize the aerodynamics of the motorcycle 10 during the travel, the at least one air conveyor 90 does not protrude beyond the fairing 20, looking at the motorcycle 10 from the front. In this way, the aerodynamics of the motorcycle 10 is not impaired and the capacity of conveying the air flows towards the cooling radiator 15 is maximized. Looking at the parked motorcycle 10 from the front, the inlet mouths 91 of the conveyor 90 are arranged above the axis of the front wheel 50, under the cowl 30 and within the maximum space occupied by the fairing 20.

Moreover, inside the conveyor 90, the sections perpendicular to the flow direction have a progressively greater area proceeding from the inlet mouth 91 to the outlet mouth 94 to decrease the speed of the air leaving the conveyor 90 and therefore improve the heat exchange with the radiator 15.

Figure 7:
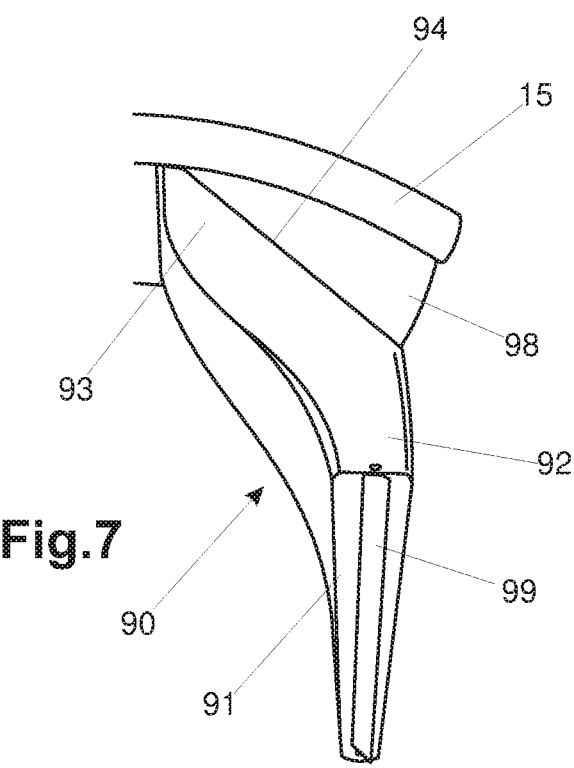
FIG. 7 shows a particular version of the air conveyor.

As shown in FIG. 7, said air conveyor 90 may also comprise a mobile shutter 99 arranged inside the conveyor 90, to modify the air passage section in the conveyor 90 itself. The mobile shutter 99 is preferably arranged in the vicinity of the inlet mouth 91. Said mobile shutter 99 may be manually operated or motorized so as to regulate the air in transit in the conveyor 91 according to the environmental conditions of the place where the motorcycle is located or to its operating conditions, to heat or cool down the cooling fluid of the engine 75.

As previously described, the cooling radiators may be more than one and arranged side by side or one above the other. The radiator 15 may therefore be a single radiator with two independent portions 18, 19, as if they were two separate radiators or two independent and separated radiators. In the latter case, as shown schematically in FIG. 5, the radiators may be two and arranged one in front of the other 15, 17. In this case, the radiator placed in front covers the radiator placed behind. For this reason, the retracted radiator 17 is thermally connected to the advanced radiator by means of a duct 21 which transfers an exchange fluid between the two radiators 15, 18. The front radiator 15, as well as cooling the second radiator 17, may also be used to cool a liquid of the motorcycle 10, for example the engine oil.

The motorcycle 10 may further comprise, as shown in FIG. 5, a fender fitted with a flap 65. Said flap 65 is shaped so as to deviate laterally the air flow that hits the motorcycle 10 as it advances. Said flap 65 may have a ridge at the centreline plane M, when the front wheel 50 is not steered. Said flap 65 has two surfaces that degrade from the crest towards the sides of the fairing 20 of the motorcycle 10. This flap 65 is shaped so as to deviate laterally, and beyond the fairing 20, the air which would otherwise enter the area between the cowl 30 and the fender 60 of the motorcycle 10. In this way, the so-called parachute effect created by the portion of the motorcycle 10 in which the radiator is normally installed is minimized. In particular, the flap 65 may be shaped so as to deflect the air that the motorcycle 10 encounters by moving towards the inlet mouths of the conveyor 90, so as to increase the flow of air entering it.

A man skilled in the art may make several changes and adjustments to the solutions described above in order to meet specific and incidental needs, all falling within the scope of protection defined in the following claims.

The invention claimed is:

1. A motorcycle comprising:
   a damped support for supporting a front wheel;
   a handlebar connected to said damped support for steering said front wheel;
   at least one radiator configured to cool at least one liquid of an engine of the motorcycle, said radiator being covered at least in part by said front wheel in a front view of the motorcycle;
   at least an air conveyor comprising an inlet mouth oriented toward the front of the motorcycle and an outlet mouth faced toward said radiator;
   said at least an air conveyor being shaped so to conduct the air entering in the inlet mouth toward the outlet mouth;
   wherein said at least one air conveyor is shaped so as to at least partially surround said front wheel when the motorcycle is viewed from above, said front wheel and said at least an air conveyor are at least partly overlapped each other in a side view of the motorcycle.

2. The motorcycle according to claim 1, wherein said inlet mouth is arranged beside said damped support.

3. The motorcycle according to claim 1, wherein said inlet mouth of said at least an air conveyor lies on a plane substantially perpendicular to a middle plane of motorcycle.

4. The motorcycle according to claim 1, wherein the outlet mouth covers at least in part the cooling radiator.

5. The motorcycle according to claim 1, wherein said outlet mouth is fluid-tightly connected through a sealing profile to said at least a cooling radiator.

6. The motorcycle according to claim 1, wherein said at least an air conveyor is shaped so to envelop said damped support in any steering degree of the front wheel.

7. The motorcycle according to claim 1, wherein when the air conveyors are two or more, said conveyors are arranged on opposite sides of the front wheel or all on the same side of the front wheel.

8. The motorcycle according to claim 1, wherein when the air conveyors are two or more, said conveyors are fluidly divided from each other.

9. The motorcycle according to claim 1, wherein said at least an air conveyor is shaped so to not laterally overhang the fairing of the motorcycle when viewed frontally.

10. The motorcycle according to claim 1, wherein said at least an air conveyor has a transversal section which increases proceeding from the inlet mouth to the outlet mouth.

11. The motorcycle according to claim 1, wherein internally to said air conveyor is arranged at least a mobile shutter adapted to modify the air cross-section in the air conveyor.

12. The motorcycle according to claim 1, wherein said cooling radiator is thermally connected to a second cooling radiator through an exchange liquid flowing into them.

13. The motorcycle according to claim 1, wherein said radiator comprises a first portion of radiator and second portion of radiator, divided from the first portion of the radiator, each one of said radiator portions being configured to cool a respective liquid of the motorcycle.

14. The motorcycle according to claim 1, comprising a fender arranged over said front wheel, wherein said fender comprises at least a flap configured to laterally divert the air hitting the advancing motorcycle.

* * * * *